United States Patent [19]

Czernik et al.

[11] 4,311,318
[45] Jan. 19, 1982

[54] HEAD GASKET ASSEMBLY AND METHOD OF MAKING SAME

[75] Inventors: Daniel E. Czernik, Hinsdale; John C. Moerk, Jr., Buffalo Grove, both of Ill.

[73] Assignee: Felt Products Mfg. Co., Skokie, Ill.

[21] Appl. No.: 211,764

[22] Filed: Dec. 1, 1980

[51] Int. Cl.³ .............................................. F16J 15/12
[52] U.S. Cl. ................................... 277/235 B; 277/1; 277/166
[58] Field of Search ...................... 277/166, 167.3, 178, 277/183, 189, 235 A, 235 B, 235 R, 227, 1

[56] References Cited

U.S. PATENT DOCUMENTS

| | | | |
|---|---|---|---|
| 1,843,297 | 2/1932 | Oven | 277/235 B |
| 1,847,729 | 3/1932 | Shaw | 277/235 B X |
| 2,157,102 | 5/1939 | Victor et al. | 277/235 B |
| 3,565,449 | 2/1971 | Ascencio et al. | 277/235 B |

*Primary Examiner*—Robert S. Ward, Jr.

*Attorney, Agent, or Firm*—Dressler, Goldsmith, Shore, Sutker & Milnamow, Ltd.

[57] ABSTRACT

An improved heat gasket assembly for sealing the block and head of an internal combustion engine where the head mounts a precombustion chamber, and method of making that gasket assembly. The gasket assembly comprises a main gasket body and an armored fire ring mounted at the combustion openings. The fire ring provides a precombustion tab underlying the precombustion chamber, against which sealing occurs. To enhance that seal, spanner elements are positioned between the wire ring and the lower leg of the armor of the fire ring in the zones in which the periphery of the precombustion chamber overlie the wire ring. When the gasket assembly is compressed between the block and the head (and precombustion chamber) the spanner elements induce a more effective and consistent seal between the fire ring, the head, and the precombustion chamber regardless of whether the precombustion chamber is flush with, projects from, or is recessed with respect to, the head.

13 Claims, 8 Drawing Figures

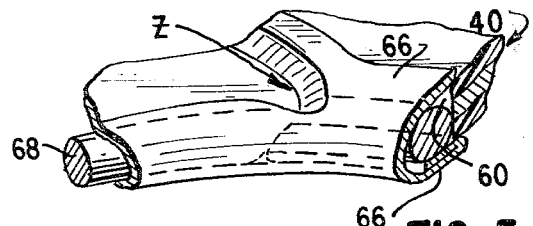
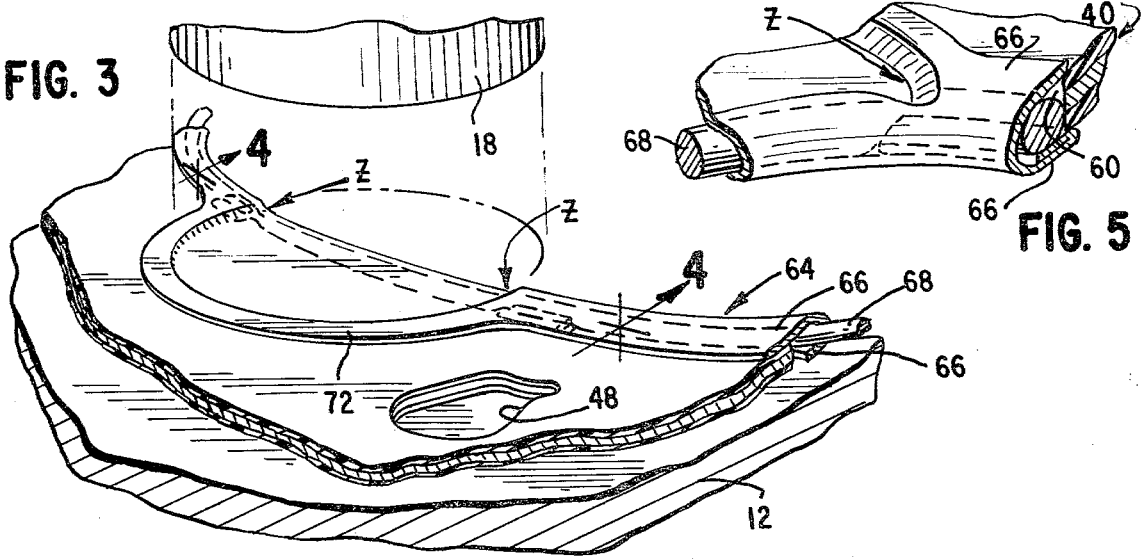
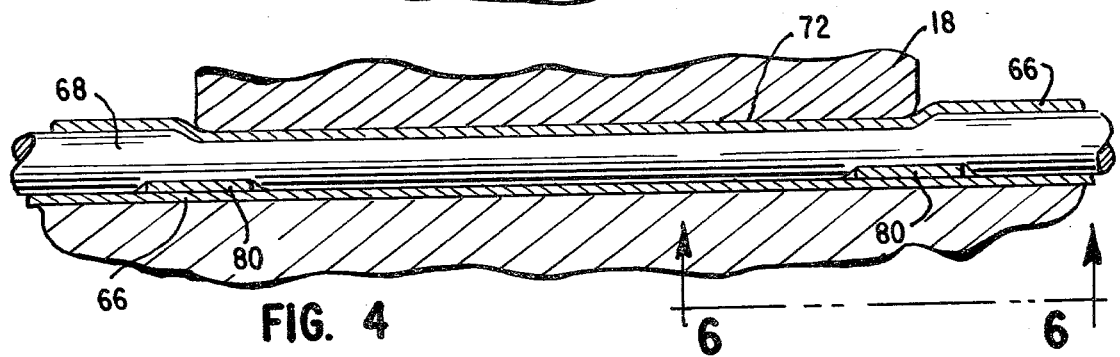
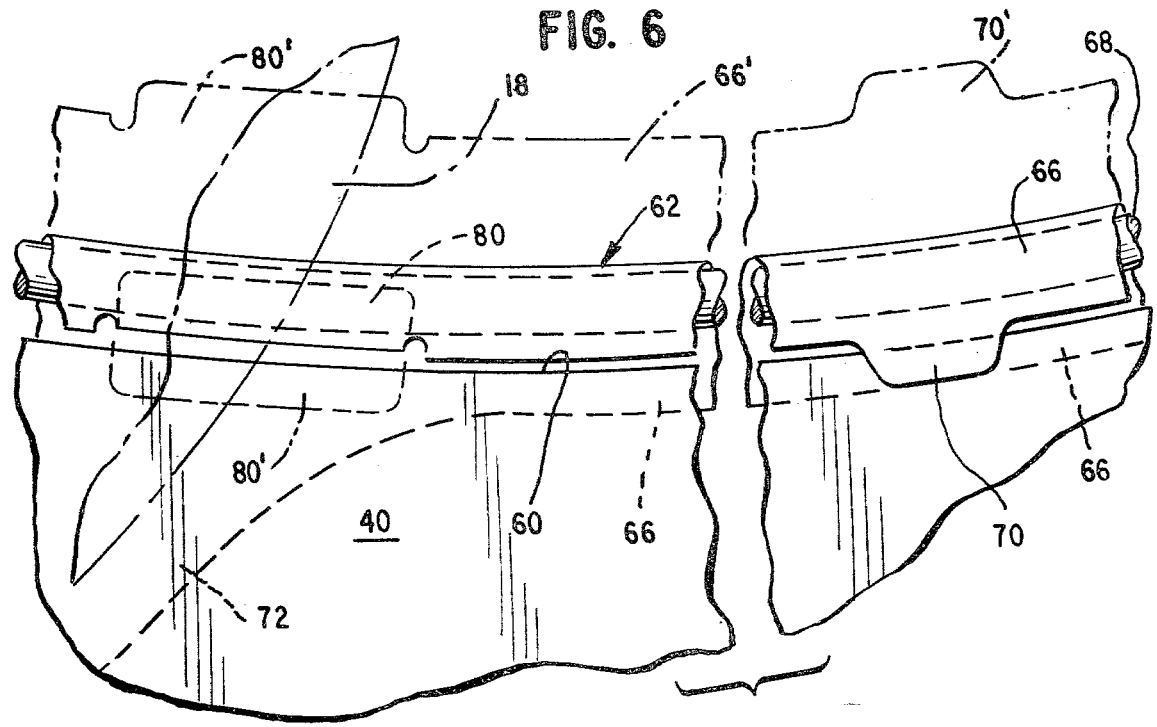

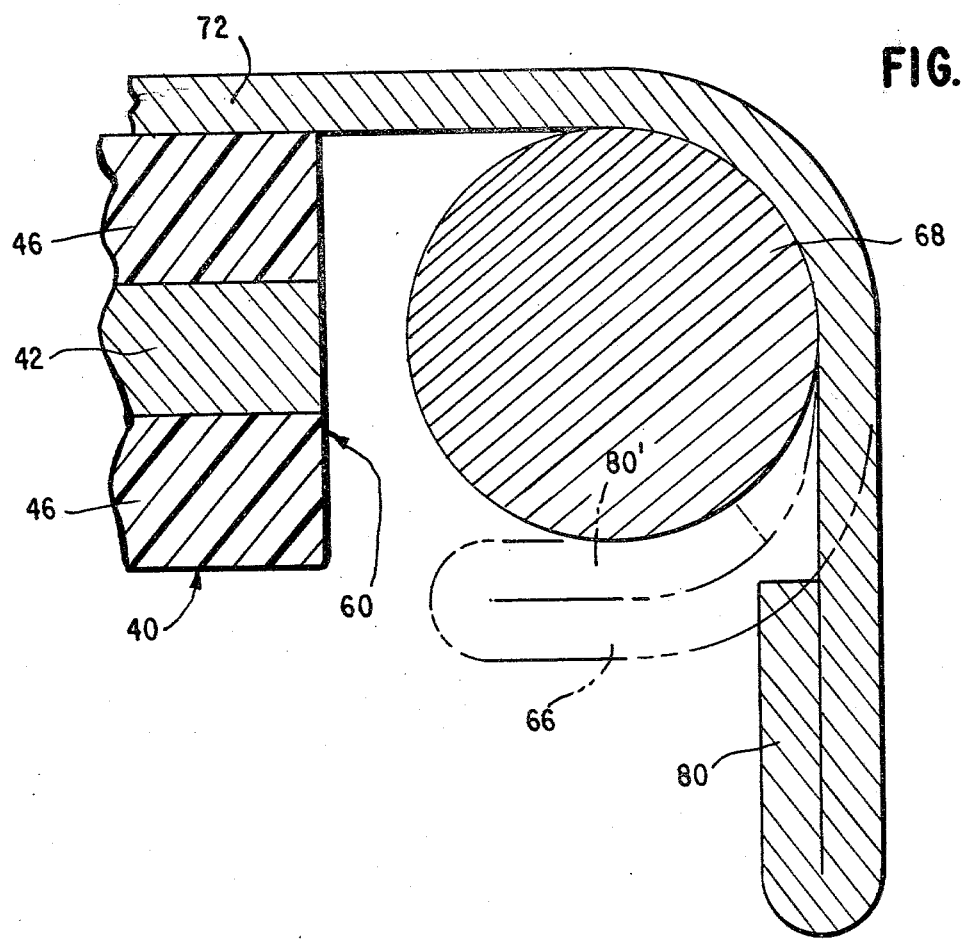
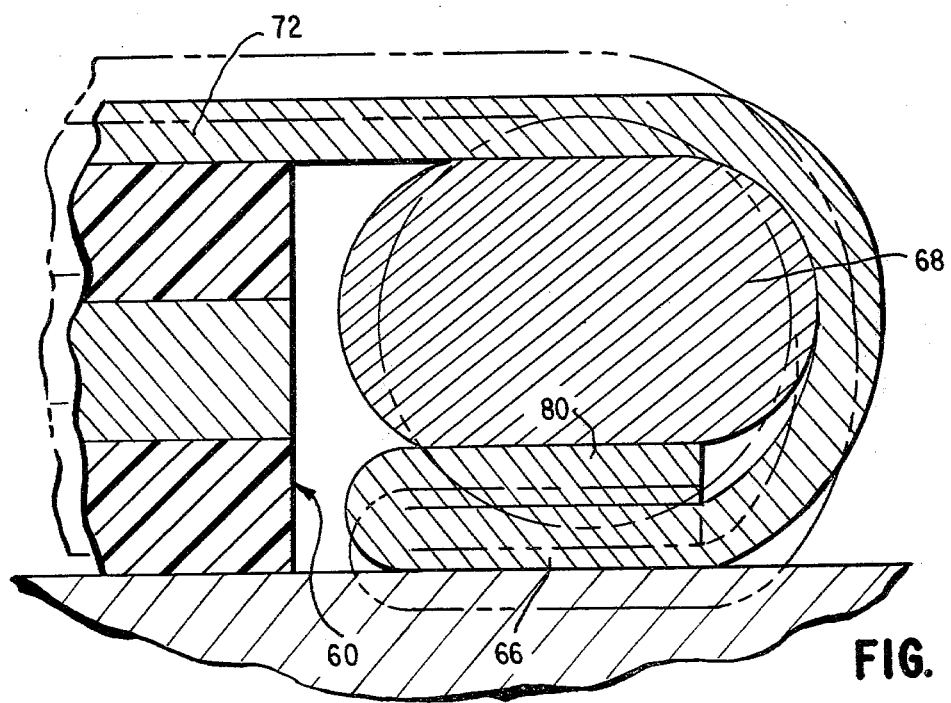

HEAD GASKET ASSEMBLY AND METHOD OF MAKING SAME

TECHNICAL FIELD

This invention relates to improvements in and to the method of making internal combustion head gaskets, and particularly to high-compression diesel engine head gaskets.

BACKGROUND OF THE INVENTION

There are a variety of head gaskets known in the prior art. Head gaskets generally comprise thin flat bodies which define a plurality of apertures, including oil and water openings and cylinder openings. These apertures are positioned in the gasket body to be aligned with cylinder bores and with water and oil ports in an engine block and engine head. The gasket body itself is intended to seal around the apertures which it defines thereby to prevent bore and port intercommunication and to prevent leakage from the bores.

In high-compression diesel engines operating at high temperatures and high pressures, it has been a practice for a number of years now to provide head gaskets with armoring adjacent the cylinder or combustion openings to seal the cylinder openings and to protect the remainder of the gasket from the effects of the high temperature and pressure. Quite frequently the gasket body itself comprises an asbestos or reinforced asbestos or impregnated asbestos packing material, which body is then provided with the armoring. A construction of that general character which is known to the art is illustrated in U.S. Pat. No. 1,819,694. In that construction, the entire gasket surface as well as the cylinder openings in the gasket is armored.

It has been found subsequently that armor enclosing the edge of the gasket body adjacent the cylinder opening is sufficient to protect the gasket and to seal the head and block at the cylinder bore. In one typical construction, also known to the art, a main gasket body comprises sheets of impregnated asbestos secured to opposite sides of a metal sheet. The combustion openings in the gasket body are enclosed by U-shaped metal annuli which surround the periphery of the combustion openings in the gaskets and which extend outwardly over and under the periphery of the opening. Although such constructions are suitable for many applications, they are not for others. In some constructions for which they are usually suitable, they do not always seal correctly and therefore sometimes permit leakage.

It has also been suggested that head gasket assemblies be provided in which an armored gasketing is positioned in a combustion opening and which is suspended from tabs which project outwardly of the combustion opening and into engagement with the gasket body. This very substantially improves upon known prior art head gaskets and an improved head gasket of this type is illustrated in U.S. Pat. No. 3,565,449.

More recently, diesel engines have been introduced into automobiles in increasing numbers. In typical diesel engines used in the United States, it has become a practice to provide a precombustion chamber for each cylinder bore which feeds fuel into the cylinder bore and to position that precombustion chamber (frequently referred to as a pre-cup) in the head and straddling the armoring. To insulate the gasket, to effect a seal, and to provide a seal for the pre-cup, a conventional diesel gasket, such as of the type shown in U.S. Pat. No. 3,565,449, has been used with an expensive tab (a pre-cup or precombustion tab) extending from the armor and outwardly over the main gasket body.

It has been found that such modified gaskets tend to permit blow-by, especially when the engine is cold, and as a result, the gaskets too frequently fail. Worse, the blow-by sometimes communicates the oil and water ports, causing blow out of the oil or water, the cooling media for the engine. If that occurs and is not quickly ascertained, the engine itself can burn out, and this has occurred with sufficient frequency to be a serious problem.

It has been determined that one of the possible reasons for the failure of the head and pre-cup to be sealed by the armoring, as a head without a pre-cup will usually do, is the discontinuity at the intersection between the head and pre-cup where it crosses or intersects the armor in the zone in which the wire of the armor underlies the armor sheath. For example, if the pre-cup projects beyond the plane of the head, then at the intersection with the wire, the wire is placed under a greater compressive load by the pre-cup than by the head. As a result, at the intersection there is a zone which may not force the ensheathing armor into sealing engagement with the head, the projecting side of the pre-cup and then the pre-cup bottom surface. The same result can occur if the pre-cup is recessed, or if there is a significant chamfer at the surface of the bore receiving the pre-cup. In that case there will be a zone in which the armor does not adequately seal the confronting head and pre-cup surfaces, and therefore there is a possible path for the escape of high presure gases from the cylinders, with the attendant damage these gases can inflict.

Of course, one solution to the problem would be to grind the faces of the pre-cup and head to a common plane and to make absolutely certain there is no chamfer at the head or pre-cup surface. However, that is impractical and expensive, and is not within the control of gasket manufacturers. Another solution would be to assemble parts so that they are absolutely flush. However, that is not a practical solution either, for tolerances of even several thousandths of an inch could not be permitted and holding to zero tolerances for pairs of mass-produced assembled parts is extremely difficult and exceedingly expensive.

Further, frequently it is not possible simply to increase the head load or to use a thicker or softer wire. Available head loads are limited and are normally used up to their maximum in engines of the type under consideration, and the load distribution in the zones of the armor and main body of the gasket have been calculated and determined. To substantially increase the portion of the load taken up in the area of the armor would reduce the load available in the main body and would permit leakage there.

SUMMARY OF THE INVENTION

In accordance with the present invention, it has been determined that effective sealing of the diesel engines having pre-cups may be accomplished without significantly altering existing and otherwise highly desireable gasket designs, without meaningfully changing the load distribution to the armor and main body of the gasket assembly and without requiring changes in manufacturing and assembly techniques for the head and pre-cup. To that end, the invention of this application contemplates a head gasket assembly for sealing the head and block of an internal combustion engine wherein the block defines a combustion cylinder, the head defines a bore in which a precombustion chamber is disposed, and the precombustion chamber is positioned partially to overlie the combustion cylinder and to discharge into said combustion cylinder, The head gasket comprises a multi-layered main gasket body and defines a combustion opening adapted to be disposed in-line with the cylinder, and a plurality of other apertures spaced away from the combustion opening. A fire ring is secured to the main gasket body adjacent the periphery of the combustion opening and comprises a metallic annulus having legs lying generally parallel to the main gasket body, a wire ring disposed between the legs and within the periphery of the combustion opening, and a precombustion tab extending from one of the legs outwardly of the combustion opening. The tab is adapted to underlie and support the precombustion chamber so that the precombustion chamber partially overlies the combustion opening. The precombustion chamber overlies and intersects the wire ring at two spaced zones of intersection.

The improved head gasket assembly of this invention provides spanner means underlying one of the legs at each of the two spaced zones of intersection, so that when the gasket assembly is disposed between the head and block and is placed under load, a more effective and consistent seal between the fire ring adjacent the precombustion tab and the head and a precombustion chamber will be obtained.

The spanner means may be integrally formed with the metallic annulus and is reversely folded to underlie the wire ring. Preferably the spanner means comprises a pair of spaced spanner elements integrally formed with the metallic annulus and the spanner elements and are reversely folded and disposed between the annulus leg spaced away from the precombustion tab and the wire ring.

The method of this invention comprises the steps of providing a main gasket body and fire ring of the kinds just described, and the further steps of providing spanner means and assembling the fire ring to the main gasket body with the spanner means underlying one of the legs of each of the two zones of intersection between the wire rings and near the periphery of the precombustion tab. Preferably the method comprises the provision of spanner means integrally formed with the annulus and reversely folding the spanner means to overlie one leg between that leg and the wire ring in the zones of intersection. The assembled fire ring and main gasket body may then be precompressed in the zones of intersection.

Further objects, features and advantages of this invention will become apparent from the following description and drawings showing a presently preferred embodiment, of which:

BRIEF DESCRIPTION OF THE DRAWINGS

FIG. 3 is an exploded partial perspective view of a section of FIG. 3 after disassembly of the gasket assembly from the engine;

FIG. 4 is an enlarged cross-sectional view taken substantially along line 4—4 of FIG. 3;

FIG. 5 is an enlarged section of FIG. 4;

FIG. 6 is an enlarged bottom plan view taken substantially along line 6—6 of FIG. 4 and showing, in phantom, part of the fire ring assembly prior to completion of the forming of the armor; and FIGS. 7 and 8 show, in stages, a method of forming portions of the fire ring of the gasket assembly of FIG. 1.

DETAILED DESCRIPTION OF AN ILLUSTRATIVE EMBODIMENT

Figure 1:
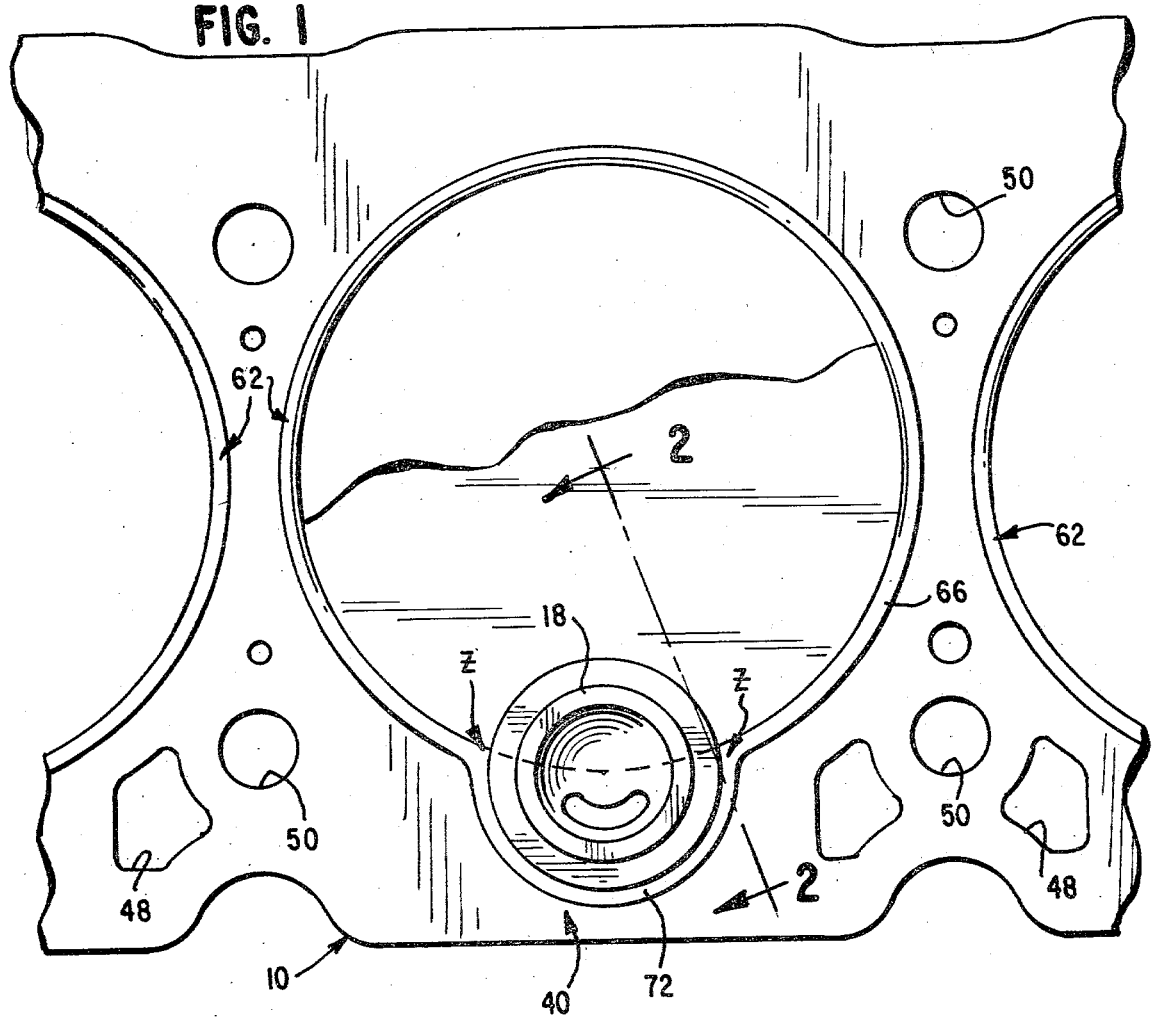
FIG. 1 is a partial plan view of a gasket assembly made in accordance with this invention.
Figure 2:
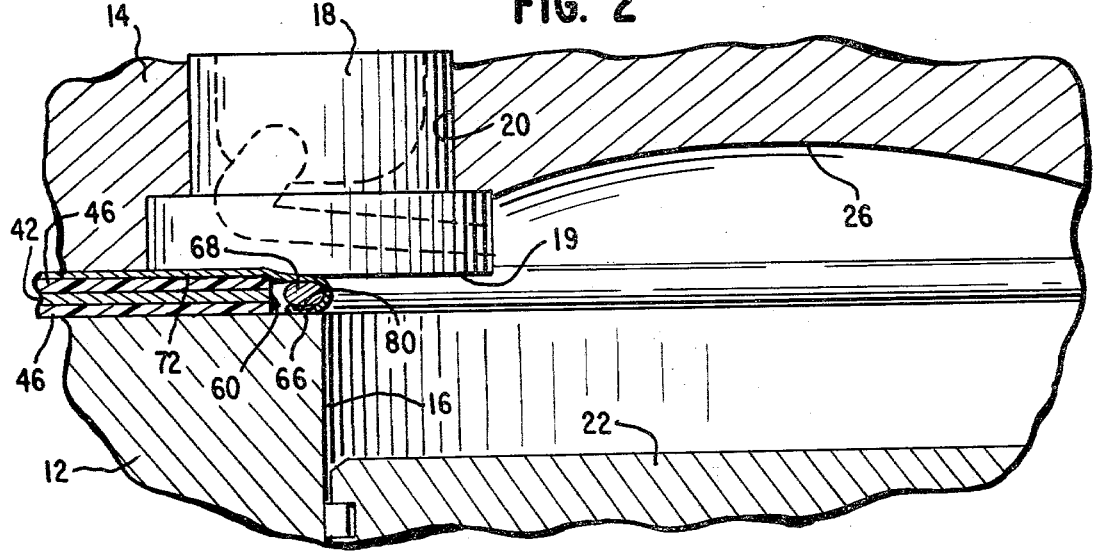
FIG. 2 is a sectional view of the gasket assembly of FIG. 1, positioned between a head and block of an internal combustion engine, taken substantially along line 2—2 of FIG. 1.

Referring first to FIGS. 1 and 2, a head gasket assembly 10 of this invention is adapted and proportioned to cooperate with an engine block 12 and an engine head 14. It is, of course, apparent that a variety of internal combustion engine block and head configurations, hence head gasket assembly configurations, may be employed in accordance with this invention.

Block 12 defines a plurality of apertures including a plurality of combustion cylinders or chambers 16 and a plurality of oil and water bores (not shown). Chambers 16 serve to cooperate with a piston 22 in a known manner. Head 14 defines a dome-shaped combustion chamber portion 26 overlying each chamber 16, and further defines a plurality of oil and water bores which are aligned with complementary aligned bores in the block. Threaded bolts (not shown) connect the head and block and serve as the means for compressing gasket assembly 10 into sealing engagement with the block and head around the apertures therein.

As seen, the gasket assembly 10 comprises a main gasket body 40, which body is a heat-sensitive multi-layer assemblage. Body 40 comprises a central core or layer 42 which may be a metal sheet. Each side of central layer 42 is fitted with a sealing layer or sheet 46 of impregnated asbestos, with such as a conventional temperature, oil and water resistant impregnant. The sheets are then superposed with each other and are pressed together with adhesive to hold the sheets to the central layer in a known manner.

Thereafter suitably positioned and proportioned apertures and openings are formed as by punching. These openings and apertures include oil and water apertures 48 which are proportioned and positioned to surround the confronting ported ends of block and head oil and water bores. Apertures 48 permit flow communication between those bores and sealingly prevent leakage of fluid beyond the apertures 48. Bolt holes 50 are also provided in the body 40 to accommodate passage of bolts through head 14 and into threaded engagement with cooperating threaded holes in the block 12.

Finally, the gasket assembly 10 defines a plurality of apertures which surround the cylinder bores, adjacent which apertures the cylinders are designed to be sealed from the surrounding portions of the gasket assembly. To that end, the main gasket body 40 defines a plurality of clear through combustion openings 60 which, in the embodiment illustrated, are generally circular. A second gasket, a fire ring 62, is provided within the periphery defined by each of these combustion openings.

Fire ring 62 comprises a generally U-shaped metallic armor or annulus 64 (FIG. 3) having a pair of legs 66 lying generally parallel to the main gasket body 40. The annulus is closed inwardly of the combustion opening and, as seen in the drawings, opens outwardly of the combustion opening 60. A wire ring 68 is disposed and ensheathed within the armor or annulus 64 and, in the embodiment illustrated, comprises a butt-welded ring which initially is substantially circular in cross-section. The annulus may be formed of stainless steel of a thickness of about 0.006 inch and the ring 68 may be of an annealed soft steel of a diameter of about 0.041 inch.

Suspending tongues 70, such as those described and illustrated in U.S. Pat. No. 3,565,449, may be formed with the annulus 64. Such tongues 70 extend to and beyond the periphery of the combustion opening 60. Those spaced tongues, only one of which is illustrated in FIG. 6, thereby serve to suspend and position the fire ring 62 in the combustion opening 60 in the main gasket body 40. Such tongues may be used on both legs or may be used on one leg of the annulus, and a full overlap may be used on the upper side, as is illustrated by FIG. 6. Alternatively, a fully overlapping fire ring may be used to mount the fire ring on both sides at the periphery of the combustion opening in the main gasket body 40.

The fire ring 62 also provides a precombustion tab 72. Tab 72 may be integrally formed with the annulus 64 and may be a continuation of one of the legs 66, as is known. As shown in the drawings, precombustion tab 72 is sufficiently expansive so that it underlies the precombustion chamber 18 to support the chamber 18 against displacement and to protect the main gasket body 40 from chamber 18. Precombustion chamber 18 is disposed within a suitably configured bore 20 in the head. Bore 20 may comprise portions of several different cross-sections as is illustrated in FIG. 2. The precombustion chamber serves to introduce fuel into the combustion chamber 16, all in accordance with known technology.

Although head gasket assemblies 10 comprising a main gasket body 40 and a fire ring 62 have been known and used for some time with eminently satisfactory results in sealing the head and block of engines, too frequently, when a precombustion chamber and precombustion tab are used, as is the case with diesel engines, especially those used for domestic service, failures arising from inadequate sealing having resulted. It has been discovered that such failures frequently occur at the zones of intersection of the precombustion chamber periphery and the fire ring, generally at the locations indicated as zones Z in FIG. 1. It has been observed that in many cases the lower surface 19 of the precombustion chamber is not flush with the adjoining generally flat surfaces of the head, and that in some cases the lower surface 19 projects beyond the adjacent head surface and in some cases it is recessed above the adjacent surface of the head. In some cases the surfaces are flush so that the intersection of the periphery of the precombustion chamber 18 with the fire ring 62 is not stepped as is the case under non-flush conditions.

It has been found that the steps produced by the stepped, non-flush conditions tend to define paths from the combustion chamber outwardly of the fire ring and that such paths may be sealed against leakage in accordance with this invention, thereby to minimize potential engine failure.

To that end, spanner means such as elements 80 are provided to underlie one of the legs 66. One spanner element is provided at each of the two zones of intersection Z between the fire ring 62 and the precombustion chamber 18 to circumferentially span those zones. The spanner elements are preferably disposed between the leg 66 spaced away from the precombustion tab 72 and the wire ring 68. As shown in the drawings, the spanner elements 80 are preferably integrally formed with a leg 66 and are reversely folded to underlie the wire ring between the leg 66 spaced from the precombustion chamber and the wire ring 68.

To form the spanner elements 80 one of the legs 66 of the annulus 64 may initially be provided with a projecting portion 80' which is adapted to be reversely folded, as is illustrated in dotted line in FIG. 6. The spanner element is then folded to the position shown in full line in FIG. 7 and is then shaped to conform to the dotted line position illustrated in FIG. 7. Thereafter the fire ring 62 may be pre-compressed in the zones Z of the spanner elements 80, thereby locally to reduce the thickness of the wire ring 68 in those zones, as shown by FIG. 8, all prior to assembly of the head gasket assembly 10 between the block and the head (and associated combustion chambers) of an internal combustion engine.

When the head gasket assembly is so assembled with an internal combustion engine under load to seal the assembly and, for example, the precombustion chamber 18 is projecting as is illustrated by FIGs. 2-5, the precombustion chamber 18 tends to indent the precombustion tab 72. That is shown in exaggerated form from illustrative purposes in FIGS. 3, 4 and 5. In connection therewith, the presence of the spanner elements 80 tends to exert a somewhat greater force in the zones of intersection Z than would the fire ring 62 absent spanner elements 80. As such, the wire ring tends to force the armor of the legs 66 and precombustion tab 72 into closer conformity and sealing engagement with the precombustion chamber 18 and the head 14 at their intersections Z. The greater localized force applied via the spanner elements 80 and the wire ring 68, provides an effective and consistent seal, unlike comparable structures without the spanner elements. However, the increased load required in zones Z does not significantly alter the load distribution on the gasket assembly 10 and therefore does not require additional load to effect a seal adjacent the combustion opening, a seal across the main body of the gasket and a seal at the zones of intersection between the precombustion chamber and fire ring 62.

It will be apparent from the foregoing description and drawings that modifications may be made without departing from the spirit and scope of this invention. For example, non-integral spanner elements may be inserted in the indicated location with similar results. Accordingly we do not intend to be limited to the specific embodiment illustrated, except insofar as may be required by the following claims.

What is claimed is:

1. In a head gasket assembly for positioning between the head and block of an internal combustion engine and wherein said block defines a combustion cylinder and said head defines a bore in which a precombustion chamber is disposed, said precombustion chamber being positioned partially to overlie said combustion cylinder and to discharge into said combustion cylinder, said gasket comprising a multi-layered main gasket body defining a combustion opening adapted to be disposed in-line with said cylinder and defining a plurality of other apertures spaced away from said combustion opening, a fire ring secured to said body adjacent the periphery of said combustion opening and comprising a metallic annulus having legs lying generally parallel to said main gasket body, a wire ring disposed between said legs and within the periphery of said combustion opening and a precombustion tab extending from one of said legs outwardly of said combustion opening and being adapted to underlie and support a precombustion chamber so that the precombustion chamber partially overlies said combustion opening, said precombustion chamber being adapted to overlie and to intersect said wire ring at two spaced zones of intersection, the improvement comprising spanner means underlying one of said legs at each of said two spaced zones of intersection, whereby when said gasket assembly is disposed between a said head and block and is placed under load, a more effective and consistent seal between the fire ring adjacent the precombustion tab and a head and a precombustion chamber will be obtained.

2. In a head gasket assembly in accordance with claim 1 wherein said spanner means is disposed between the leg spaced away from the precombustion tab and the wire ring.

3. In a head gasket assembly in accordance with claim 1 in which said spanner means is integrally formed with the metallic annulus and is reverse folded to underlie the wire ring.

4. In a head gasket assembly in accordance with claim 1 in which the spanner means comprises a pair of spaced spanner elements integrally formed with the metallic annulus and are reverse folded to be disposed between the leg spaced away from the precombustion tab and the wire ring.

5. In a head gasket assembly in accordance with claim 4 in which said gasket assembly is compressed in said spaced zones of intersection thereby locally to reduce the thickness of the wire ring prior to the positioning of the head gasket between a head and block of an internal combustion engine.

6. A sealed internal combustion engine assembly comprising a head, a block and a head gasket sealingly positioned therebetween, said block defining a combustion cylinder and said head defining a bore in which a precombustion chamber is disposed, said precombustion chamber partially overlying said combustion cylinder to discharge into said combustion cylinder, said head gasket assembly comprising a main gasket body defining a combustion opening disposed in-line with said cylinder and defining a plurality of other apertures spaced away from said combustion opening, and a fire ring secured to said body adjacent the periphery of said combustion opening, said fire ring comprising a metallic annulus having legs lying generally parallel to said main gasket body, a wire ring disposed between said legs and within the periphery of said combustion opening, and a precombustion tab extending from one of said legs outwardly of said combustion opening and underlying and supporting said precombustion chamber, said precombustion chamber overlying and intersecting said wire ring at two spaced zones of intersection, and spanner means underlying one of said legs at each of said two spaced zones of intersection, whereby said gasket assembly provides a more effective and consistent seal between the fire ring adjacent the precombustion tab and the head and the precombustion chamber will be obtained, thereby to prevent blow-by of gases from said combustion cylinder.

7. The sealed internal combustion engine assembly of claim 6 wherein said spanner means is disposed between the leg spaced away from said precombustion tab and said wire ring.

8. The sealed internal combustion engine assembly in accordance with claim 6 in which said spanner means is integrally formed with the metallic annulus and is reverse folded to underlie the wire ring.

9. The sealed internal combustion engine assembly in accordance with claim 6 in which said spanner means comprises a pair of spaced spanner elements, each reversely folded to lie between the leg spaced from precombustion tab and said wire ring, thereby to enhance the seals between the fire ring and the precombustion tab in the zones of intersection.

10. A method of making a head gasket assembly for positioning between the head and block of an internal combustion engine in which the block defines a combustion cylinder and the head defines a bore in which a precombustion chamber is disposed, the precombustion chamber being positioned partially to overlie said cylinder and to discharge into said cylinder, the steps comprising providing a main gasket body defining a combustion opening adapted to be disposed in-line with a combustion cylinder and defining a plurality of other apertures spaced away from said combustion opening, providing a fire ring comprising a metallic annulus having legs for lying generally parallel to the main gasket body, a wire ring disposed between said legs and a precombustion tab extending from one of said legs to underlie and support a precombustion chamber, so that said chamber may partially overlie a combustion opening, providing spanner means, and assembling said fire ring to said main gasket body with said wire ring being disposed within the periphery of said combustion opening and with said spanner means underlying one of the legs at each of the two zones of intersection between the wire ring and near the periphery of the precombustion tab, whereby when said gasket assembly is placed under load, a more effective and consistent seal between the fire ring adjacent the precombustion tab and a head and a precombustion chamber will be obtained.

11. The method of claim 10, wherein the spanner means is integral with the annulus, and comprising the further step of reversely folding an outwardly projecting portion of a leg to overlie said leg and to underlie said wire ring in said zones of intersection.

12. The method of claim 11, wherein said gasket assembly as formed in accordance with claim 11 is compressed in the zones of the spanner means thereby locally to reduce the thickness of the wire ring prior to positioning of the head gasket between the head and block of an internal combustion engine.

13. The method of claim 10, wherein the spanner means comprises a pair of spanner elements, each positioned at one of said zones of intersection.

* * * * *